(12) United States Patent
Ahmed et al.

(10) Patent No.: US 10,956,513 B2
(45) Date of Patent: Mar. 23, 2021

(54) HEURISTICALLY PROGRAMMED ARTIFICIAL INTELLIGENCE FOR MAINFRAME OPERATING SYSTEMS

(71) Applicant: International Business Machines Corporation, Armonk, NY (US)

(72) Inventors: Ahmed Faraj Ahmed, Milpitas, CA (US); Dario D'Angelo, Los Gatos, CA (US); Haojun Li, Berkeley, CA (US); Kevin A. Washington, Jr., Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 688 days.

(21) Appl. No.: 15/166,602

(22) Filed: May 27, 2016

(65) Prior Publication Data
US 2017/0344887 A1    Nov. 30, 2017

(51) Int. Cl.
*G06N 5/02*    (2006.01)
*G06F 16/951*    (2019.01)
(Continued)

(52) U.S. Cl.
CPC .......... *G06F 16/951* (2019.01); *G06F 16/972* (2019.01); *G06N 5/02* (2013.01); *G06N 20/00* (2019.01); *G10L 13/08* (2013.01); *G10L 15/22* (2013.01); *G10L 15/26* (2013.01); *H04L 67/02* (2013.01)

(58) Field of Classification Search
CPC ...... G06F 17/30864; G06N 5/02; G10L 13/08
See application file for complete search history.

(56) References Cited

U.S. PATENT DOCUMENTS

| 8,150,697 B2 | 4/2012 | Mandalia |
| 9,858,329 B2 * | 1/2018 | Laligand ................ G06Q 50/01 |

(Continued)

OTHER PUBLICATIONS

Gondoprastowo, Ivan, "Multi-stage Human-computer Interaction for Command Refining on an Intelligent Personal Assistant" Department of Computer Science and Engineering The Hong Kong University of Science and Technology, May 2, 2014 (132 Pgs.).

(Continued)

*Primary Examiner* — Hal Schnee
(74) *Attorney, Agent, or Firm* — Cantor Colburn LLP; Teddi Maranzano (57) ABSTRACT

Disclosed herein is a heuristically programmable system comprising a web-socket; a backend component that is in operative communication with the web-socket to act as a heuristically programmed algorithm framework that is operative to interact with a user in natural language and in a human-like manner; a main frame computer; a web server that is in operative communication with an internet; where the main frame computer and the web server are in operative communication with the web socket; and a cognitive computing system; where the web socket comprises a computer system configured to provide a voice, motion and/or a graphical interface to a user; and where the web socket is operative to communicate with the cognitive computing system; where the cognitive computing system is operative to convert speech to text and to send this text to the web socket.

12 Claims, 3 Drawing Sheets

(51) Int. Cl.
  *H04L 29/08* (2006.01)
  *G06F 16/958* (2019.01)
  *G06N 20/00* (2019.01)
  *G10L 13/08* (2013.01)
  *G10L 15/22* (2006.01)
  *G10L 15/26* (2006.01)

(56) References Cited

U.S. PATENT DOCUMENTS

| | | | |
|---|---|---|---|
| 2005/0055321 A1 | 3/2005 | Fratkina | |
| 2008/0282104 A1* | 11/2008 | Khan | G06F 11/3608 714/2 |
| 2013/0031208 A1* | 1/2013 | Linton | G09B 7/02 709/217 |
| 2014/0136013 A1* | 5/2014 | Wolverton | B60K 35/00 701/1 |
| 2014/0225724 A1* | 8/2014 | Rankin | G06F 3/048 340/438 |
| 2014/0258286 A1 | 9/2014 | Brown | |
| 2014/0316764 A1 | 10/2014 | Ayan | |
| 2015/0030152 A1* | 1/2015 | Waxman | H04M 3/5233 379/265.11 |
| 2015/0212988 A1 | 7/2015 | Ogawa et al. | |
| 2017/0161101 A1 | 6/2017 | Khazanchi et al. | |
| 2017/0364948 A1* | 12/2017 | Datta | G06Q 30/0255 |

OTHER PUBLICATIONS

Sakr, Shard "Voice assistant 'Nina' lets any app obey commands, makes speech your password" http://www.engadget.com/2012/08/06/nuance-nina-voice-assistant-sdk/ Aug. 6, 2012, 1 Page.

Ahmed Faraj Ahmed, "Heuristically Programmed Artificial Intelligence for Mainframe Operating Systems", U.S. Appl. No. 15/294,151, filed Oct. 14, 2016.

List of IBM Patents or Patent Applications Treated as Relates; (Appendix P), Filed Oct. 20, 2016; 2 pages.

* cited by examiner

HEURISTICALLY PROGRAMMED ARTIFICIAL INTELLIGENCE FOR MAINFRAME OPERATING SYSTEMS

BACKGROUND

This disclosure relates to heuristically programmed artificial intelligence for an operating system. In particular, this disclosure relates to a heuristically programmed artificial intelligence for a "System z" mainframe operating system also known as z/OS.

Managing or using a network of computers and/or other devices, such as, for example, a mainframe computer can be a challenging task since this type of information technology (IT) environment comprises a multitude of rather complex interconnected software products (hereafter referred as subsystems) operating under the control of an already complex operating system. Training and retaining talent that is knowledgeable and comfortable in managing and/or operating this platform are as challenging as ever. Currently becoming proficient in the System z architecture, products and components is a daunting task and often requires many years of training in order to become even minimally effective. Additionally, System z and z/OS in particular are not commonly covered subjects by the vast majority of colleges and universities, making the task of learning a whole new complex platform a daunting task for any new hire.

Some of the problems associated with current systems are that each product running on a mainframe computer, such as, for example, a System z mainframe are very complex and extremely hard to manage and maintain. In addition, the talent pool is dwindling for those who have deep experience and knowledge in z System platform. Mastering the system involves steep and extremely long learning curves to become proficient at it (sometimes involving time periods of 10 or more years), only to discover there is a lot more to learn. Large number of software products, architectures and components all with different requirements have to be maintained along with applied fixes, business logic and rules. It is difficult to stay up-to-date and become aware of new functions that are potentially beneficial to the environment. It is also difficult to know if any given operation can result in a system, product, or component failure.

It is therefore desirable to have an advanced system that can guide, instruct and act within the intricacies of the mainframe operating system management, its operations and each of its sub-components and their resources that is usable by a wide variety of user's roles of different skill levels. The main hurdles users face when interacting with the mainframe platform can be summarized in the following points:
1. Each product running on System z operating system (called z/OS) is very complex and extremely hard to manage and maintain;
2. The talent pool knowledgeable about the environment is dwindling;
3. A steep and extremely long learning curve is to be expected to become proficient at it (decades);
4. A large number of software products, architectures and components all with different requirements have to be maintained (fixes applied), along with business logic, processes and best practice guidelines to be respected;
5. It is hard to stay up-to-date and become aware of newly available functions that are potentially beneficial to the environment; and
6. It is extremely difficult to know if any given operation can result in a system, product or component failure.

It is therefore desirable to have a system that is adaptable to differ levels of user skills.

SUMMARY

Disclosed herein is a heuristically programmable system comprising: a web-socket: a backend component that is in operative communication with the web-socket to act as a heuristically programmed algorithm framework that is operative to interact with a user in a human-like manner; a main frame computer; a web server that is in operative communication with an internet; where the main frame computer and the web server are in operative communication with the web socket; and a cognitive computing system; where the web socket comprises a computer system configured to provide a voice, motion and/or a graphical interface to a user; and where the web socket is operative to communicate with the cognitive computing system; where the cognitive computing system is operative to convert speech to text and to send this text to the web socket.

Disclosed herein too is a method comprising querying a heuristically programmable system that comprises a web-socket; a backend component that is in operative communication with the web-socket to act as a heuristically programmed algorithm framework that is operative to interact with a user in a human-like manner; a main frame computer; a web server that is in operative communication with an internet; where the main frame computer and the web server are in operative communication with the web socket; and a cognitive computing system; where the web socket comprises a computer system configured to provide a voice, motion and/or a graphical interface to a user; and where the web socket is operative to communicate with the cognitive computing system; where the cognitive computing system is operative to convert speech to text and to send this text to the web socket; and receiving an answer or receiving a query from the system, where the query is designed to elicit further information from a user that enables the system to provide an answer to the query.

Disclosed herein too is a method comprising a non-transitory storage medium readable by a processing circuit and storing instructions for execution by the processing circuit for performing a method for deadlock avoidance in a network comprising querying a heuristically programmable system that comprises a web-socket; a backend component that is in operative communication with the web-socket to act as a heuristically programmed algorithm framework that is operative to interact with a user in a human-like manner; a main frame computer; a web server that is in operative communication with an internet; where the main frame computer and the web server are in operative communication with the web socket; and a cognitive computing system; where the web socket comprises a computer system configured to provide a voice, motion and/or a graphical interface to a user; and where the web socket is operative to communicate with the cognitive computing system; where the cognitive computing system is operative to convert speech to text and to send this text to the web socket; and receiving an answer or receiving a query from the system, where the query is designed to elicit further information from a user that enables the system to provide an answer to the query.

DETAILED DESCRIPTION

Disclosed herein is a system that includes cloud-based heuristically programmed algorithms (hereinafter termed a "HAL framework") that use an interface (it can be web-based interface but it is not limited to it. The interface can include any capable electronic device (with a microphone, a display and/or a speaker) that can interact with the users in a human-like manner in order to accomplish complex multi-step tasks related to the operation, maintenance, installation, configuration, application execution of software artifacts present in a given operating system or information technology (I/T) infrastructure. In an embodiment, the HAL framework can be implemented as a web-based application (ideally residing on a cloud environment) designed to interact with the users in a human-like manner to accomplish information technology related tasks. The term "human-like" includes systems having human form and/or attributes as opposed to those of animals or other inanimate objects.

The system includes the ability to manage an iterative process that permits a user to ask questions in a natural language and to receive a human like answers (in a natural language). The HAL framework is also designed for multi-step, iterative interactions. In other words, the system includes a framework capable of asking one or more questions to the user in order to gather all the information desirable to successfully accomplish a requested task. This can be especially useful in those cases involving complex user requests in which it is not practical or feasible for the user to provide all the information at once. While interacting in natural language is useful to most users, the ability to instantaneously access of a variety of relevant information repositories (on the web), rank the results in relationship to the request, and use the user's interaction with the system as way to create more accurate models for future interactions is very useful in assisting future users to avoid frustrating roadblocks.

The system disclosed herein has a number of advantages over other systems that are voice enabled. In an embodiment, the HAL framework disclosed herein may interface with System z, z/OS Management Facility or z/OSMF (an interface to the mainframe operating system), z/OS (operating system) subsystems or z/OS in general. The HAL framework is capable of interacting with software and can understand software concepts while other systems that are voice enabled have no ability to understand software concepts. In an embodiment, the system is a voice enabled interface (though other interfaces such as displays and keyboards may also be used) for provisioning, configuring, and operating on a given software platform, that can issue commands and perform operations against a software application. In another embodiment, the HAL framework is capable of interacting with software residing on multiple platforms. Currently no single interface—voice enabled or otherwise—can interact with System z as well as with a Windows-based server.

With reference now to the FIG. 1, a system 100 that comprises a web-socket 104, a backend component 106, a "main frame" computer 108, (e.g., a System z mainframe computer); a subsystem 110 (e.g. a System z operating system -z/OS), the world wide web (www) and associated resources 112 (hereinafter web browser resources 112) and a cognitive computing system (e.g., IBM's Watson) 114. The backend component 106 is in operative communication with a database 116.

A user 102 communicates with the system 100 via the web-socket 104. One or more of the web-socket 104, the backend component 106, the z operating system main frame computer 108, the subsystem 110 (e.g., System z operating system -z/OS), the world wide web (www) and associated resources 112 and the cognitive computing system (such as for example IBM's Watson) 114 are hereinafter referred to as "components" of the system. The components of the system may be part of a network (i.e., they reside on an internal network) or alternatively, may reside on a cloud server.

The web-socket 104 is an interface that can communicate with the backend component 106. As seen in the FIG. 1, the web-socket interface 104 and the backend component 106 form the HAL framework 200. The HAL framework 200 preferably resides on a cloud server. In an embodiment, the cloud server resides on the web. As seen in the FIG. 1, each of the components of the system 100 can communicate back and forth with the components immediately adjacent to them and through them with other components in the system. For example, the web-socket 104 is in a back and forth operative communication with the backend component 106. In a similar manner, the backend component 106 is in back and forth operative communication with the z operating system main frame computer 108, while the z operating system main frame computer 108 is in back and forth operative communication with the subsystem 110 (e.g., -z/OS). The web-socket 104 is also in back-and-forth communication with the cognitive computing system 114 as well as the world-wide-web and associated resources 112.

While the discussion herein is directed to the System z platform (mainly for purposes of convenience), it is to be noted that it is equally applicable to other mainframe systems such as, for example, ClearPath Libra mainframes, Nonstop systems, DPS, BS2000, or the like. It should also be noted that even if the mainframe can be considered the prime candidate for the HAL framework, the concept of cognitive entity leveraging a body of knowledge of Information Technology (I/T) can be applied to any software platform (Linux, Windows Server, Cloud based platforms (PaaS) and alike) and can be considered a natural extension or augmentation of the HAL framework.

When two components of the system are in "back and forth communication" with each other, they may be in a closed loop with each other. The closed loop may include one or more additional components. In short, the closed loop may include 2 or more components. The term "operative communication" may include electrical communication, magnetic communication, electromagnetic communication, or a combination thereof. In an embodiment, the components of the system can communicate with one another via one or more networks such as, for example, a wireless cellular network, a wireless local area network (WLAN) or Wi-Fi network, a Third Generation (3G) mobile telecommunications network, a private network such as an intranet, a public network such as the Internet, or some combination thereof.

The web-socket 104 may be a voice, motion and/or a graphical interface that is operative to communicate with the cognitive computing system 114, the world wide web 112, the backend component 106 and through the backend component 106 to the database 116. The user 102 communicates with the web-socket 104 via voice, motion (body movements, hand movements, facial movements, eye movements, and the like), textual communication, graphical communication, and the like. In short, the web socket 104 may have a camera and also comprises software that can understand motion made by a user. The web socket's ability to understand text, voice and motion provides it with the ability to communicate in an almost human like manner with the user.

The web-socket 104 may include a computer system configured to provide telephone access to applications and data. It may include appropriate software and hardware interfaces for receiving Internet Protocol (IP) calls, conventional landline telephone calls, wireless calls, cellular calls, or any combination thereof. Additionally, it may include interfaces for communicating with any of a variety of different telephone platforms and/or other applications as mentioned herein, including the Public Switched Telephone Network (PSTN).

In an optional embodiment, the web-socket 104 may include a speech recognition engine that detects and recognizes words spoken over a received call and passes those words to an application as text. The speech recognition engine further can process dual tone multi-frequency signals as may be received from a touch-tone telephone. An audio playback system also can be included for playing prompts to callers. For example, the web-socket 104 can include an audio playback system to play recorded audio, or a text-to-speech (TTS) engine, or both. The TTS engine can synthesize speech from application text for playback over an established telephone call.

In an embodiment, web-socket 104 may include an automatic speech recognition system where a user with a user interface that is in communication with the ethernet (the internet) can be provided with feedback pertaining to the automatic speech recognition process in the form of a text transcript. Examples of the user interface include applications such as a smart phone, tablet or other form of a web interface. The user can then use the user interface to make corrections to the text transcript derived from the automatic speech recognition system. The corrections can then be stored with an identifying tag in the automatic speech recognition system for further use. In an embodiment, the corrected text can further be corrected by administrators or by the user (with the appropriate permissions). While the disclosure herein discusses the user as being a mobile user, it is to be understood that the user may be any person having a user interface such as, for example, an employee in an office who is seated at his/her desk and not necessarily moving around.

The HAL framework also can operate off an enhanced security protocol with regard to the identification (ID) of a user attempting to access a system. Currently software platform interfaces (especially in System z) do not perform user Identification but rather rely on credentials like a Userid and Password to access a given resource or a given system. Because the nature of the HAL framework interface foresees the use of the user voice to interact with a system, it is conceivable to implement and integrate the use of voice biometrics and/or facial recognition (when/if the hardware device interface is provided with a camera) to establish the identity of the user prior to permitting use of the system and in addition to the credentials verification. In environments, such as, for example a typical System z mainframe, security is paramount, and the introduction of an additional level of user identification can be valuable. Additionally, HAL infrastructure can further validate the identity of the user based on publicly available information such as: Facebook, Twitter or an employee directory.

The web-socket 104 or alternatively, the backend component 106 in conjunction with the database 116 may therefore include software that enables the system 100 to determine whether a user can use the system 100 and which aspects of the system 100 the user can access. In an embodiment, the web-socket 104 may authenticate a user 102 by one or more of voice recognition, biometric identification (e.g., fingerprint evaluation, eye evaluation, eye movement evaluation, and the like), a password, and the like. In an embodiment, the user 102 may present to the web-socket 104 a key (fob) which contains a data wrapper. The data wrapper may include security/privacy parameters associated with the rights, permissions, and other indicia used to define and indicate the security and privacy parameters related to the person's data privacy and security requirements. In other embodiments, the security/privacy parameters include one or more levels of negotiable privacy and security parameters. For example, the security/privacy parameters may include cases for certain data, such as personal data associated with a person's social security number, body type, weight, address, age, fingerprint identification, and other data personal to the person.

In an embodiment, the authentication may comprise user 102 identification (ID) in the form of an encrypted file that is a combination of personal data and other data unique to the person. Such a user ID may also contain the negotiation parameters or be tied to a contract or other document that indicates the person's data utilization criteria and negotiation parameters. For example, the user ID may be linked to a terms of service that stipulates the user's intended use for the data being transmitted, the expiration date or time, data recombination criteria, monetary information for data use, and the like. The user ID may grant permission to the user 102 to access and train on only certain portions of the system 100 depending upon a level of access granted to the user by a controlling authority.

The web-socket 104 may reside on a network server or on a cloud server (not shown). In a preferred embodiment, the web-socket 104 resides on a cloud server.

The back end system 106 is configured to interact with the web socket 104, a database 116 (e.g., a JSON database), the z-operating system mainframe 108 and the z/operating system 110 with the appropriate management protocols. For example, the back end system 106 can receive voice or text messages from the web socket 104 and format the message as an SNMP message, a JMX message, or another message type depending upon which system the received text or instruction is to be routed to and the management system protocol used by the target managed system.

The backend component 106 uses HAL backend logic which is driven by the logic used by the web socket 104 (e.g., HAL web socket component logic). The backend component 106 is in operative communication with a JSON database 116 that uses human-readable text to transmit data objects consisting of attribute-value pairs. The backend component 106 is operative to generate a HAL response object based on desired parameters.

The backend component 106 in conjunction with the database 116 (the HAL framework 200) are operative to store a variety of interactions that enable the user to more easily navigate the system. In an embodiment, the HAL framework 200 may interface with System z, z/OS Management Facility or z/OSMF (an interface to the mainframe operating system), z/OS (operating system) subsystems or z/OS in general. The HAL framework 200 may interact with software and can understand software concepts while other systems that are voice enabled have no ability to understand software concepts. In another embodiment, the HAL framework 200 is capable of interacting with software residing on multiple platforms. Currently no single interface—voice enabled or otherwise—can interact with System z as well as with a Windows-based server.

The HAL framework 200 is also capable of blurring the line between cloud and on-premises environments. In an embodiment, the HAL framework 200 can adapt to the skill level of the user. By breaking down a complex task in a series of interactions/questions, the user 102 is guided through the completion of the process even if she/he has a minimal understanding of the overall process. This intuitive human-like interaction significantly reduces the need for a tutorial or for know-how, or alternatively, may increase the need for a tutorial or a series of tutorials. SIRI® does not seem to support more than two levels of interaction for a single and relatively simple task. Other System z interfaces assume that the user knows or can easily discover what to do (e.g., z/OSMF, CloudSM).

The HAL framework 200 is operative to reduce system complexity which makes learning the system easier. The enables easier training schedules with consequent talent retention. The reduction in complexity involves simplifying, automating and guiding a user (e.g., a new user or an experienced user) through product provisioning, product installation and configuration, and product operations. The HAL framework 200 provides instant defect/bug notifications to users and administrators. The HAL framework 200 can also perform research on the IBM and non-IBM applications and databases if the operation requested by the user is vulnerable to any previously known defect and can notify the user of the risk. It also provides the ability to detect problems and seek solutions as they occur.

The HAL framework 200 can simplify, automate and guide a user or administrator through product maintenance. The HAL framework 200 therefore plays a role in terms of simplification and guidance. It enables seamless access to cloud resources and to hybrid clouds whenever available. It also provides real-time analytics on software produced data (messages, CPU consumption, storage usage, and the like) and enables the integration of lightning fast cluster computing (e.g., SPARK). In summary, the HAL framework 200 understands or has "knowledge of" software concepts; and/or understands or has "knowledge of" hardware architectures.

The HAL framework 200 can also act as a software marketing/sales tool. For example, a given task that the user is trying to accomplish may use a product that is not available or installed in the target system. HAL can compensate for this deficiency by providing the information about the product and even conduct a demonstration of it for a user.

The HAL framework 200 can make new products and offerings instantaneously available to any customer on a "when-needed" or "when asked" manner. It can arrange for licensing technologies if desirable and explain the concepts of licensing to the user along with associated benefits where desirable. It therefore represents a direct an instantaneous connection between the users' need and the knowledge/awareness of the product(s) that satisfy his/her needs. The HAL framework therefore focuses on the task and accomplishing the task rather than on the infrastructure needed to accomplish it. In an embodiment, the HAL framework may be capable of interacting with software residing on multiple platforms. Currently no single interface—voice enabled or otherwise—can seamlessly interact with System z as much as with a Windows server.

In an embodiment, the HAL framework 200 also uses advanced identification systems in addition to the traditional user/password model to mitigate social engineering and fishing threats that cause system disruption. As noted above, the window socket 104 may also be involved in identifying a user and determining his/her access to the system 100.

HAL may create associations between user identity and each interaction (of the user with the system) to develop a relevance profile over time. For example, a question asked twice in succession (or not in succession) by the same user should result in two different replies from HAL. However as HAL masters the personal attributes of the user and his or her desires over time, the first answer provided by HAL to this particular user will be increasingly useful. In an embodiment, HAL will be able to recognize the mood of the user and generate responses to that may be based on its knowledge of the mood of the user.

The HAL framework 200 is therefore designed to deal with I/T concepts and thus a part of its architecture is based on the availability of a database 106 that comprises a comprehensive collection of software products along with I/T artifacts, features, components, acronyms and standards. It is the use and access to this data base and its supporting information that permits the HAL framework (i.e., the algorithms) to recognize the key elements of the user request and to initiate the proper process.

As noted above, the HAL framework 200 uses a heuristic technique that leverages the availability of structured and unstructured information available in the world-wide-web 112. Using these different data sets, a heuristic function, also called simply a heuristic, ranks alternatives in results obtained from search algorithms at each branching step based on the information extracted from the original user request. This ranking provides the user with an opportunity to decide which branch to follow based on the ranking. Thus, the system 100 is able to approximate the exact solution with a certain degree of confidence and with a measurable level of accuracy.

In other words, the use of heuristic techniques produces a solution in a reasonable time-frame that may be useful for solving the problem at hand. This solution may be designed to be the best of all the actual solutions to this problem given the current set of available information (user interactions). It has to be noted that while the solution may only be an approximate solution to the query, it is still valuable because finding the solution does not necessitate the use of a prohibitively long time to obtain a precise manual analysis of all available data sets accompanied by a simultaneous ranking of the results' relevance.

The HAL framework 200 is also capable of collecting and documenting user's "experiences" and interactions from the pool of users interacting with it, thus expanding the number of models that the HAL framework 200, in particular, the heuristic algorithms can scan and analyze in order to identify an answer—with a greater degree of certainty—that may satisfy a new user's request. As a result, the HAL framework 200 can be seen as cognitive entity with a dynamically growing body of knowledge (beyond the existing world-wide-web information data sets) not dissimilar from a "learning" engine.

In an embodiment, the system 100 does not only interact with the user using natural language, but it can also provide the user with the ability to enter/type information from any input device that has a keyboard, a display and a wireless/wired connection to the world-wide-web. The input device may be stationary (e.g., a desktop located in a building) or mobile (e.g., a cell phone or tablet). In some embodiments, when it is not practical for the HAL framework 200 to provide long answers in a voice format, the system 100 is able to display information related to the user's request on the user interface display screen.

The HAL framework 200 is also capable of collecting "experiences" and interactions from a pool of users interacting with it, thus expanding the number of models HAL framework 200 can scan to identify an answer that would satisfy a user request with a greater degree of certainty. As a result, the HAL framework 200 is continuously dynamically growing cloud applications while other existing System z interfaces are not.

In an embodiment, the mainframe server 108 is an IBM System Z™ server, offered by International Business Machines Corporation, Armonk, N.Y., and one or more of the processors execute an operating system, such as z/OS®, also offered by International Business Machines Corporation. (IBM and z/OS are registered trademarks of International Business Machines Corporation, Armonk, N.Y., USA. Other names used herein may be registered trademarks, trademarks or product names of International Business Machines Corporation or other companies.)

The cognitive computing system 114 is a question and answer (QA) computing system that is artificially intelligent and is capable of answering questions posed in natural language. A QA computing system is generally built to apply advanced natural language processing, information retrieval, knowledge representation, automated reasoning, and machine learning technologies to the field of open domain question answering. One of the challenges of teaching a deep-analytic QA system is keeping the system current with the latest terms, people, and events. The lexicon, vocabulary, and slang used in a language evolves rapidly over time.

The cognitive computing system 114 may include a knowledge manager (not shown) that comprises one or more processors and one or more memories, and potentially any other computing device elements generally known in the art including buses, storage devices, communication interfaces, and the like) connected to the computer network (not shown). The computer network may include multiple computing devices (not shown) in communication with each other and with other devices or components via one or more wired and/or wireless data communication links, where each communication link may comprise one or more of wires, routers, switches, transmitters, receivers, or the like. The knowledge manager and the computer network may enable question/answer (QA) generation functionality for one or more content users. Other embodiments of knowledge manager may be used with components, systems, sub-systems, and/or other devices.

The knowledge manager may be configured to receive inputs from various sources. For example, knowledge manager may receive input from the network, a corpus of electronic documents or other data, a content creator, content users, and other possible sources of input. In one embodiment, some or all of the inputs to the knowledge manager may be routed through the network. The various computing devices on the network may include access points for content creators and content users. Some of the computing devices may include devices for a database storing the corpus of data. The network may include local network connections and remote connections in various embodiments, such that knowledge manager may operate in environments of any size, including local and global, e.g., the Internet. An exemplary cognitive computing system 114 is IBM Watson™ system.

In one manner of operating the system 100, when a request for information or a query is made by user 102, the input is received by the web-socket 104 (which is part of the HAL framework 200—also referred to herein as the HAL corpus), in the form of a speech data packet. The web-socket 104 then sends the speech data packet to the IBM Watson speech-to-text API where it's converted to text; this text is then sent back to the web-socket 104.

Figure 1:
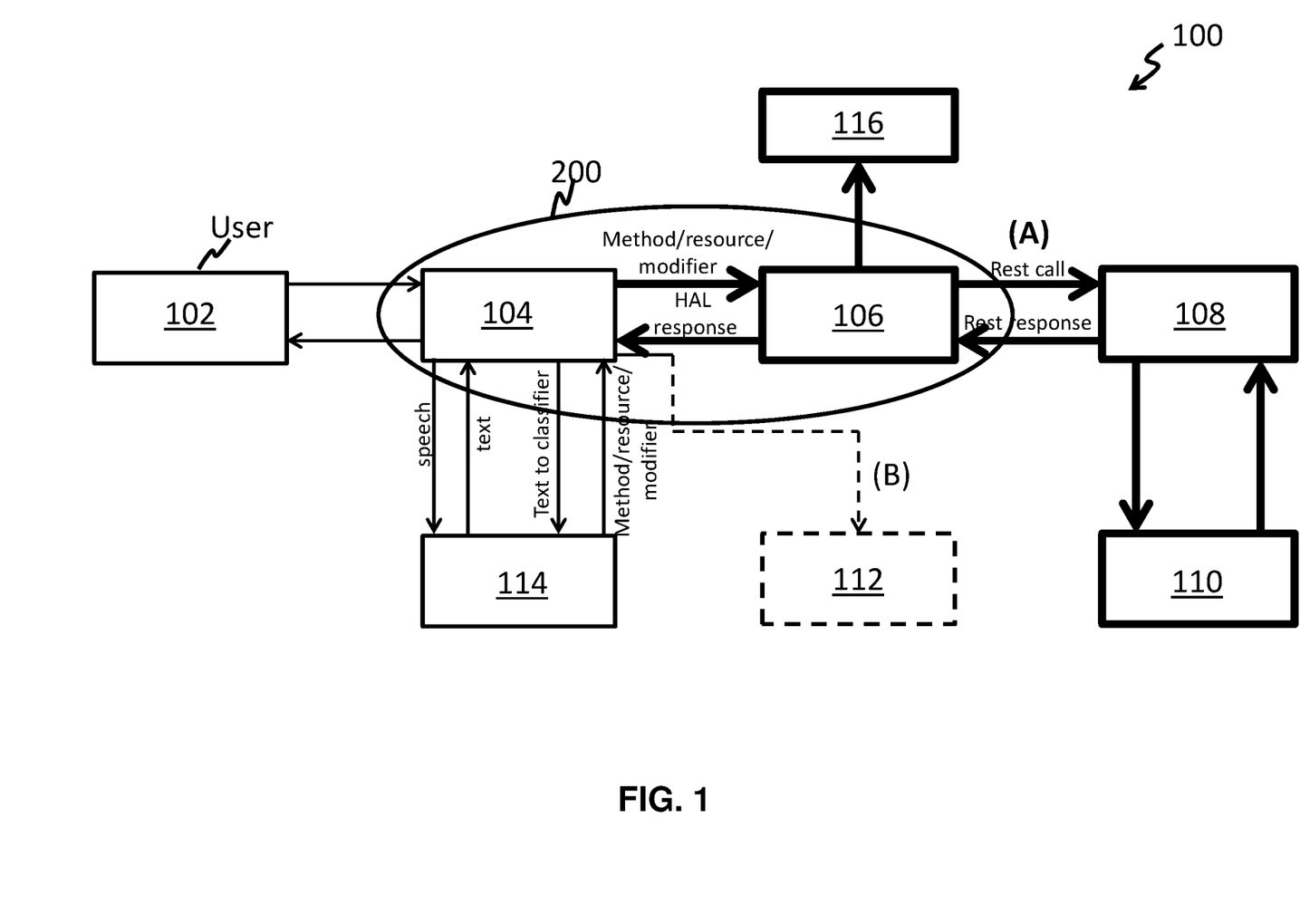
FIG. 1 is a schematic depiction of an exemplary system that uses heuristically programmed algorithms to interact with the users in a human-like manner.

At this point if the request is related to subsystem x (z/OS) 110 action (path (A)—indicated by the bolded solid lines in the FIG. 1) the following process takes place.

The text is routed back to IBM Watson classifier API to perform a statistical analysis of the text received by the web-socket 104. Based on the "likelihood" percentage of the results, the HAL logic used by the HAL framework will choose, for instance, the top 3 labels (or the top 3 results from the statistical analysis of all possible answers). Each set of 3 labels represents a HAL actionable process.

If the action resulting from the label assignment is found to be related to a subsystem (z/OS) 110 request, the web socket 104 will drive the backend component 106 as shown by the bolded lines and detailed below as follows:

1. Search the JSON database 116 and find the appropriate information to issue against the z operating system main frame computer using the z/OSMF REST Interface 108.

2. Determine if any additional parameter is desirable for the z/OSMF REST call to be correctly issued (if any).

3. If there are no additional parameters that are desirable, the backend component 106 will proceed to step 8 below. If not, the backend component 106 will generate a HAL framework response object based on the desired parameters.

4. Any response requesting additional information is then relayed by the web socket 104 to the user 102.

5. The user 102 provides a response in response to the request for additional information. Once the user 102 response is received by the web socket 104, the web socket 104 searches for additional information using the backend component 106 and/or the z-operating system main frame computer 108. The backend component 106 and/or the z-operating system main frame computer 108 provide an appropriate response to the user 102. It is to be noted that if the user response 102 is in the form of audio data, a speech to text conversion is performed. In short, the web-socket 104 determines the information (either a choice or a text written by the user) and fills the desired parameter with appropriate response.

6. Points 4 an 5 above between web socket 104 and user 102 continues until all desired parameters or queries are answered as a result of a back and forth interaction between the web socket 104 and the user 102. In other words, repeated interactions (which are optional and based on the user's discretion) between the user 102 and the web socket 104 and between the web socket 104 and the backend component 106 and/or the main frame computer 108 may continue till the user 102 receives a satisfactory response.

7. The web socket 104 will then provide the information to the backend component 106.

8. Assuming all the information needed to satisfy the request is available, the back end system 106 selects the appropriate method such as, for example, GET, POST, PUT, and the like, that are made available by the z/OSMF REST API.

9. A decision to use the appropriate z/OSMF REST API is then made by the backend component 106 targeting the user-specified z/OS subsystem 110.

10. Once the z/OS subsystem 110 finishes performing the task/JOB/command required by the z/OSMF REST API call a notification (REST call response) is send back to the backend component 106.

11. The web socket component 104 is notified by the backend component 106 of the request completion and depending on the nature of the response a text-to-speech service is—for instance—requested by the WATSON API.

12. The web socket 104 relays the response to the user 102. It is conceivable that certain systems' response produce large amount of output and might be inappropriate to perform a text-to-speech conversion of this data that can overwhelm the user. A System response analysis module will determine if a given response output is suitable for speech conversion or simply display it to the user terminal in a text format.

In summary, when the user 102 makes a request of the system 100, the input is received from the HAL web socket 104 in the form of speech data packet. The HAL web socket 104 then analyze the user request and decides to sends the speech data packet to a cognitive computing system 114 (e.g., a IBM Watson speech-to-text API) where it is converted to text; this text is then sent back to the HAL web socket 104. The logic within the web-socket 104 determines whether the request should go to backend component 106, the JSON database 116, the mainframe 108 and the subsystem 110. Back and forth queries between the components of the HAL framework 200 (the web socket 104 and the backend component 106) as well as the other components of the system 100 such as the mainframe servers 108 and 110 result in further refining of the responses and with assistance from the user 102 via the web socket 104, and eventual answer is presented to the user 102 in either voice, text, or both voice and text formats, preferably in a voice format. The responses may be presented to the user in a ranked format enabling the user to identify for an appropriate response based on its ranking.

If however, the action resulting from the label assignment is found to be related to a z/OS request rather than a z/OS action/task, the HAL web socket 104 will perform the following steps:
1. The HAL web socket 104 has a set of one or more web resources 112 URLs (shown in the dotted lines in the FIG. 1) predetermined by the HAL mainframe;
2. Once the appropriate basic URL is located, the HAL web socket 104 will format the URL by adding the query arguments extracted from the original user 102 request;
3. This formatted URL is then sent back to the user 102 in text form; and
4. The web browser resources 112 of the user 102, will display the formatted URL information within a frame at the HAL interface.

The implementation of HAL includes but it is not limited to 3 types of human-to-artificial intelligence requests.

1. Requests related to System z concepts, acronyms, and elements that use just an explanation. These type of request are satisfied by creating search arguments with a high probably of accuracy against "knowledge-center like" documentation repositories, presentations, forums and alike that are predefined and known to contain corpus-related information.

2. Requests related to actions, commands or operations against z/OS products, its subcomponents and/or subsystems. This is accomplished by the use of z/OS Management facility (or z/OSMF) basic REST API functions and the use of the z/OSMF plug-in named "Workflows" (both available with z/OS 2.1).

3. Guidance through processes that are related to System z product installation or Demos. This is accomplished by invoking z/OSMF "Workflows" (on the target system or on a cloud environment) that are to be created by IBM, vendors, or other entities with vested interest in the marketing, adoption, and penetration of a given product.

In summary, to achieve its goals, the HAL framework can leverages IBM technologies like Watson Natural Language Classifier API, Watson speech-to-text recognition, and the Bluemix platform or similar software artifacts for the user interface part. Any back-end operation (any command or operation directly related to z/OS) are performed by zOSMF, its REST API services, and the "Workflows" plug-in.

In the embodiment described in this application these are two fundamental software pre-requisites, on which HAL is built upon and with which much of the functionality described in this disclosure become possible.

Watson on Bluemix provides services such as speech to text, natural language classifier, and text to speech. Using Watson restful API, HAL is able to translate voice requests into text; the text is then used to form and issue commands typical of these environments. Depending on the request, HAL algorithm can direct the command(s) towards a set of known systems or—in the absence of them—a predefined System z cloud environment. The websocket is a WebSphere Liberty Profile. For this specific implementation of the Proof of Concept, Open Source record.js is also used.

Beyond the standard basic services provided by the z/OSMF REST API, it is conceivable that an organization such as, for example IBM, a vendor, or a system programmer of a target system z environment could create a set of universal workflows that can be triggered by the user voice-commands. These "workflow-satisfiable" requests can be associated to specific or generic environment operations and accomplish tasks including—but not limited to: product installation, product provisioning, database provisioning, application provisioning, subsystem interconnectivity or any other process or operation that can be "scripted" within a workflow.

While it is recognized that SMEs create z/OSMF workflows (and the associated XML definition files), it is useful to realize that once that is accomplished, HAL can provide, execute or guide to the process on-demand and without relying on the availability of the SMEs. That is to say: once the workflow appropriately encode how to accomplish a task, that knowledge and skill can be made available by HAL "ad-infinitum", to any user, anywhere, at any time.

HAL can thus become the ideal interface for System z by providing users with an intuitive and a simple interface to interact with z/OS. This solution can be seen as a subject matter expert (SME) always being available and with the ability to automatically adapt to the skill level of the user; by asking questions that are pertinent to the task to carry out HAL does not only encourage a person to learn, discover, understand or solve problems on his or her own, but also enable them to accomplish very complex tasks with a the minimum knowledge possible.

In a version of HAL being a cloud based application running on Bluemix, it is conceivable that HAL algorithm can use a learning schema that analyzes all the end—user interactions (and the sentences structures used to accomplish a task) to train itself and become more proficient in interpreting the user requests and initiate the statistically meaningful, appropriate or correct commands. It is conceivable to integrate voice biometric technology for user identification and authorization.

The system disclosed above is advantageous in that it makes learning the system easier by reducing the complexity of the system—which involves simplifying, automating and guiding a user through a variety of system operations. By accumulating and maintaining a database of user experiences, the system can guide a user through a variety of protocols easily and efficiently while substantially reducing encounters with frustrating roadblocks. The system also provides the ability to detect problems and seek solutions as they occur.

The system is further advantageous in that it can simplify, automate and guide a user or administrator through product maintenance. The system provides access to cloud resources and to cluster computing resources when the HAL framework deems it suitable.

The system and the method disclosed herein is exemplified by the following non-limiting example.

EXAMPLE

An empowered mainframe operator (the user) engages the HAL framework in a cloud based application to have a natural language iterative conversation. By simply describing the task to HAL, the user will be able to perform a given task with minimal knowledge of the platform, products, architecture or of the environment involved in executing the task. The HAL corpus will enable the operator not only to perform specific, multi-step tasks against a System z resource, but also to proactively leverage the knowledge of best practices, known issues, previous successful interactions, related solutions, related products, similar forum(s) questions, presentations, articles or even identify specialists that would be most likely to provide additional relevant insight.

Definitions

A heuristic technique, often called simply a heuristic, is an approach to problem solving, learning, or discovery that employs a practical method not guaranteed to be optimal or perfect, but sufficient for the immediate goals. Where finding an optimal solution is impossible or impractical, heuristic methods can be used to speed up the process of finding a satisfactory solution. Heuristics can be mental shortcuts that ease the cognitive load of making a decision. Examples of this method include using deduction by knowledge, a rule of thumb, an educated guess, an intuitive judgment, stereotyping, profiling, or common sense.

In computer science, artificial intelligence, and mathematical optimization, a heuristic is a technique designed for solving a problem more quickly when classic methods are too slow, or for finding an approximate solution when classic methods fail to find any exact solution. This is achieved by trading optimality, completeness, accuracy, or precision for speed. In a way, it can be considered a shortcut.

In this particular implementation the heuristic technique leverage the availability of structured and unstructured information available in the world wide web. Using these different data sets a heuristic function, also called simply a heuristic, can rank alternatives in search algorithms at each branching step based on available information extracted by the original user request to decide which branch to follow. Thus, it may approximate the exact solution with a certain degree of confidence and with a measurable level of accuracy.

The objective of a heuristic is to produce a solution in a reasonable time frame that is good enough for solving the problem at hand. This solution is designed to be the best of all the actual solutions to this problem given the current set of available information, but it may also be an approximate of the exact solution. It has to be noted that it is still valuable because finding it does not need the prohibitively long time implied by a manual analysis of all available data set and the simultaneous ranking of the results relevance. Heuristics may produce results by themselves, or they may be used in conjunction with optimization algorithms to improve their efficiency (e.g., they may be used to generate good seed values).

IBM z Systems is a family name used by IBM for all of its mainframe computers. The IBM zEnterprise System is designed to offer both mainframe and distributed server technologies in an integrated system. The zEnterprise System consists of three components. First is a System z server. Second is the IBM zEnterprise BladeCenter Extension (zBX). Last is the management layer, IBM zEnterprise Unified Resource Manager (zManager), which provides a single management view of zEnterprise resources. The zEnterprise is designed to extend mainframe capabilities—management efficiency, dynamic resource allocation, serviceability—to other systems and workloads running on AIX on POWER7, and Microsoft Windows or Linux on x86.

JSON (JavaScript Object Notation) is an open standard format that uses human-readable text to transmit data objects consisting of attribute-value pairs. JSON is a language-independent data format. It is typically derived from JavaScript, but now code to generate and parse JSON-format data is available in many programming languages.

Simple Network Management Protocol (SNMP) is an Internet-standard protocol for collecting and organizing information about managed devices on IP networks and for modifying that information to change device behavior. Devices that typically support SNMP include routers, switches, servers, workstations, printers, modem racks and more. SNMP is widely used in network management systems to monitor network-attached devices for conditions that warrant administrative attention. SNMP exposes management data in the form of variables on the managed systems, which describe the system configuration. These variables can then be queried (and sometimes set) by managing applications.

JMX (Java Management Extensions) is a set of specifications for application and network management in the J2EE development and application environment. JMX defines a method for Java developers to integrate their applications with existing network management software by dynamically assigning Java objects with management attributes and operations. JMX facilitates the centralized management of managed objects (called MBeans) which act as Java wrappers for applications, services, components, or devices in a distributed network. The actual management is provided by an MBean server, which acts as a registry for all manageable resources. The MBean server is the spine of the JMX architectural frame, allowing server components to plug in and discover all manageable objects. Java Management Extensions for management and monitoring are an optional extension to the standard Java Developer Kit (JDK) and can be used in place of Simple Network Management Protocol (SNMP).

(REST) Representational state transfer is the software architectural style of the World Wide Web. More precisely, REST is an architectural style consisting of a coordinated set of architectural constraints applied to components, connectors, and data elements, within a distributed hypermedia system. REST ignores the details of component implementation and protocol syntax in order to focus on the roles of components, the constraints upon their interaction with other components, and their interpretation of significant data elements. Through the application of REST architectural constraints certain architectural properties are induced: performance, scalability, simplicity, modifiability, visibility, portability, and reliability.

API (application program interface) is a set of routines, protocols, and tools for building software applications. The API specifies how software components should interact and APIs are used when programming graphical user interface (GUI) components.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
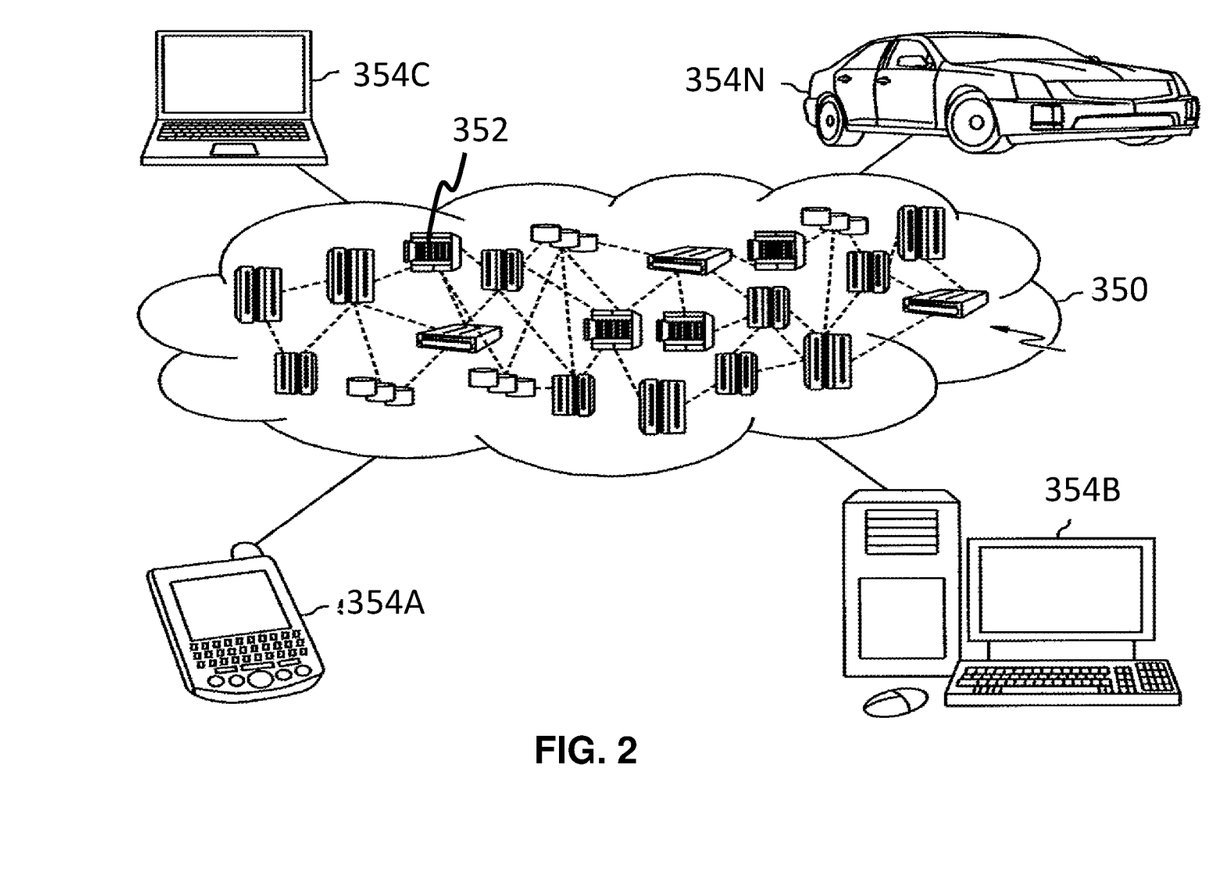
FIG. 2 depicts a cloud computing environment according to some embodiment of this disclosure.

Referring now to FIG. 2, illustrative cloud computing environment 350 is depicted. As shown, cloud computing environment 350 comprises one or more cloud computing nodes 352 with which local computing devices used by cloud consumers, such as, for example, personal digital assistant (PDA) or cellular telephone 354A, desktop computer 354B, laptop computer 354C, and/or automobile computer system 354N may communicate. Nodes 352 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 2 are intended to be illustrative only and that computing nodes 352 and cloud computing environment 350 can communicate with any type of computerized device over any type of network and/or network addressable connection (e.g., using a web browser).

Figure 3:
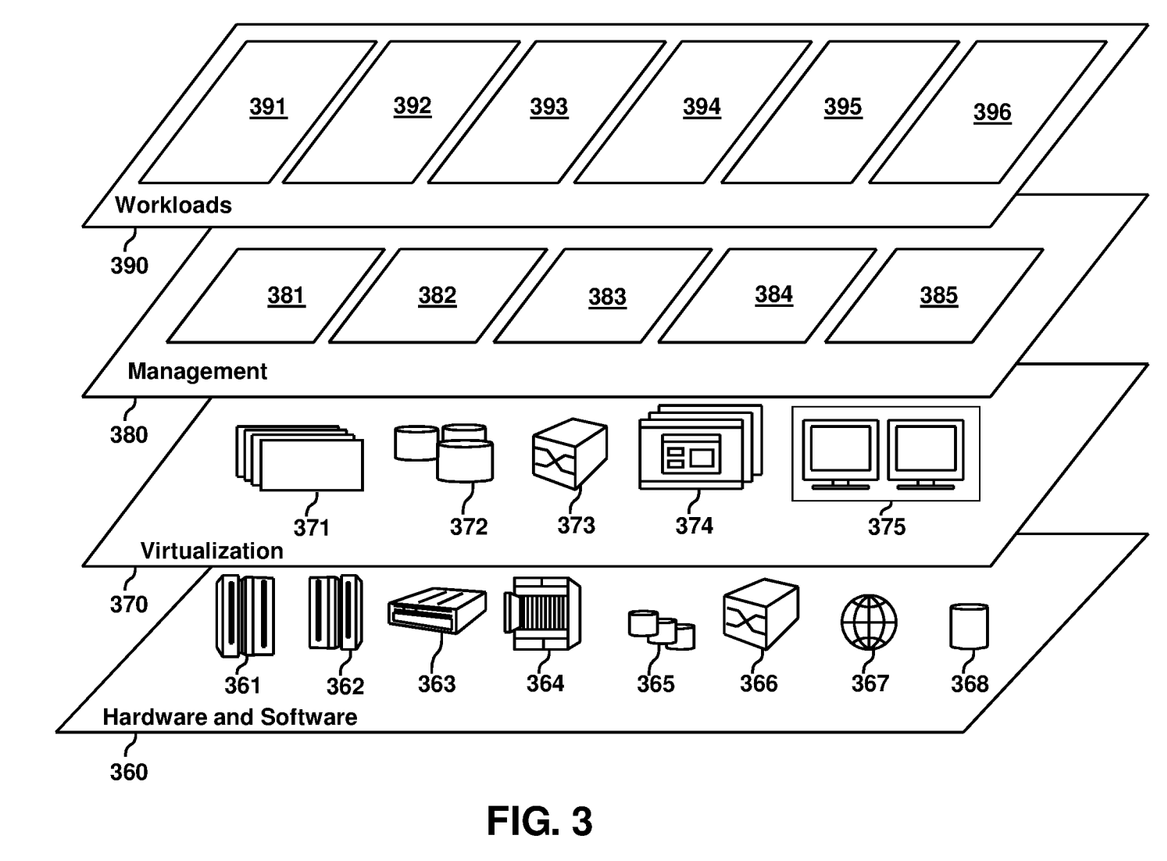
FIG. 3 depicts abstraction model layers according to some embodiments of this disclosure.

Referring now to FIG. 3, a set of functional abstraction layers provided by cloud computing environment 350 (FIG. 2) is shown. It should be understood in advance that the components, layers, and functions shown in FIG. 3 are intended to be illustrative only and embodiments of the invention are not limited thereto. As depicted, the following layers and corresponding functions are provided.

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provides pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and an image processing and object location processing 396. The software development and lifecycle management 392 may perform one or more methods that allow automatically expiring out source code comments to operate, such as but not limited to the methods described in reference to FIG. 1 for example.

Technical effects and benefits include the ability to provide recursive analysis of ETL job flows (data lineage) and real-time sensitive source data alerts to determine whether or not an ETL job submission will lead to potential sensitive data leakage. This can reduce the chance that sensitive data will be leaked to unauthorized users. In addition, embodiments provide users with information about what is needed to remedy the flow and sources to allow the ETL job to run without leading to data leakage.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A heuristically programmable system comprising:
a web-socket;
a backend component that is in operative communication with the web-socket to act as a heuristically programmed algorithm framework that is operative to interact with a current user from among a pool of capable users in a human-like manner;
a main frame computer;
a web server that is in operative communication with an internet; where the main frame computer and the web server are in operative communication with the web socket; and
a cognitive computing system; where the web socket comprises a computer system configured to provide a voice, motion and/or a graphical interface to a user; and where the web socket is operative to communicate with the cognitive computing system; where the cognitive computing system is operative to convert speech to text and to send this text to the web socket,
wherein the cognitive computing system performs back and forth querying between the web-socket, the backend component and the main frame computer, collects and documents the current user's experiences and interactions based on the querying, and dynamically expands a number of models based on the querying utilized to provide an answer or a reply query to an initial query submitted by the current user; and
wherein the web socket receives the answer or the reply query from the cognitive computing system, and wherein the reply query is based on at least one model among the number of models and is designed to elicit further information from the current user that enables the cognitive computing system to provide the answer to the initial query,
wherein the heuristically programmable system further performs operations of:
extracting, via the cognitive computing system, at least one query argument from the initial query;
determining, via the main frame computer, a targeted URL among a plurality of predetermined web resource URLs based on the at least one query argument;
formatting, via the web socket, the targeted URL by adding the at least one query argument to the targeted URL to generate a formatted targeted URL capable of invoking a workflow to the current user; and
displaying, via the graphical interface, the formatted targeted URL capable of invoking the workflow to the current user,
wherein the workflow is a scripted sequence of executed operations that accomplishes a user's desired task including at least one of product provisioning, database provisioning, application provisioning, and subsystem interconnectivity.

2. The heuristically programmable system of claim 1, further comprising a database that is in operative communication with the heuristically programmed algorithm framework and wherein the heuristically programmed algorithm framework:
a) searches the database;
b) issues a request to the main frame computer; and/or
c) communicates with a web-server to determine one or more responses to a request from a user.

3. The heuristically programmable system of claim 2, where the responses are ranked in relationship to a user request.

4. The heuristically programmable system of claim 1, where the heuristically programmed algorithm framework is implemented as:
a) a web-based application; or
b) a cloud based application; and/or
c) can use cluster computing to effect a solution.

5. The heuristically programmable system of claim 1, where the web-socket, the backend component, the main frame computer, and an operating subsystem are in back and forth operative communication with one another to resolve an issue or a query posed by a user, and wherein communication between the web socket and predetermined URL's on the internet perform iterative interactions resulting in a multi-step response that successfully accomplishes the user's desired task that corresponds to the initial query.

6. The heuristically programmable system of claim 1, where the web-socket comprises:
a) a motion detector that can respond to a motion of a user; and/or
b) at least one of i) telephone access to applications and data, ii) a speech recognition engine, and iii) a security recognition system.

7. The heuristically programmable system of claim 1, where the heuristically programmed algorithm framework is configured to:
a) store a variety of interactions between a user and the system that enable the user to more easily navigate the system;
b) interact with software;
c) understand or have "knowledge of" software concepts; and/or
d) understand or have "knowledge of" hardware architectures.

8. The heuristically programmable system of claim 1, where the heuristically programmed algorithm framework is operative to reduce complexity for a user by adapting to a skill level of the user through a series of interactive questions that enable it to determine a skill level of the user.

9. The heuristically programmable system of claim 8, where reduction in complexity involves simplifying, automating and guiding a user through product provisioning, product installation and configuration, and product operations.

10. The heuristically programmable system of claim 8, where the heuristically programmed algorithm framework:
a) provides instant defect notifications to users and administrators;
b) performs research on applications and databases if an operation requested by a user is vulnerable to any previously known defect and notifies the user of a risk; and/or
c) provides an ability to detect problems and seek solutions as they occur.

11. The heuristically programmable system of claim 1, where the heuristically programmed algorithm framework:
a) acts as a software marketing/sales tool based on a task that a user is trying to accomplish;
b) conducts a demonstration of the software marketing/sales tool for the user;
c) makes new products and offerings instantaneously available to a customer on an "when-needed" or "when asked" manner; and/or
d) arranges for a license for technology that is used to respond to a query.

12. The heuristically programmable system of claim 1, where the heuristically programmed algorithm framework authenticates a user by voice recognition, biometric identification and/or a password or alternatively, identifies a user by authenticating a data wrapper that includes an encrypted file that is a combination of personal data and other data unique to a user.

* * * * *